(No Model.)

E. T. STARR.
ELECTRODE FOR ELECTRIC BATTERIES.

No. 290,942. Patented Dec. 25, 1883.

WITNESSES
Harry King
James Young.

INVENTOR:
Eli T. Starr,
by Wm. J. Peyton
Attorney.

United States Patent Office.

ELI T. STARR, OF PHILADELPHIA, PENNSYLVANIA, ASSIGNOR OF ONE-HALF TO WILLIAM J. PEYTON, OF WASHINGTON, DISTRICT OF COLUMBIA, AND H. M. LEWIS AND JAMES W. WHITE, OF PHILADELPHIA, PENNSYLVANIA.

ELECTRODE FOR ELECTRIC BATTERIES.

SPECIFICATION forming part of Letters Patent No. 290,942, dated December 25, 1883.

Application filed May 23, 1883. (No model.)

*To all whom it may concern:*

Be it known that I, ELI T. STARR, of the city and county of Philadelphia, in the State of Pennsylvania, have invented a certain new and useful Electrode for Electric Batteries, of which the following is a specification.

My invention relates more particularly to improvements in electrodes for secondary batteries, and constitutes an improvement upon the electrode shown, described, and claimed in the application of myself and E. Eugene Starr, filed December 31, 1881. My object is to improve such electrodes by enlarging or increasing the surface exposed to chemical action without materially increasing the weight or size, and to so construct an electrode as to enable the energy of the charging-current to be readily accumulated or stored, and, further, to provide an electrode of great efficiency.

The subject-matter claimed is pointed out at the close of the specification.

Figure 1:
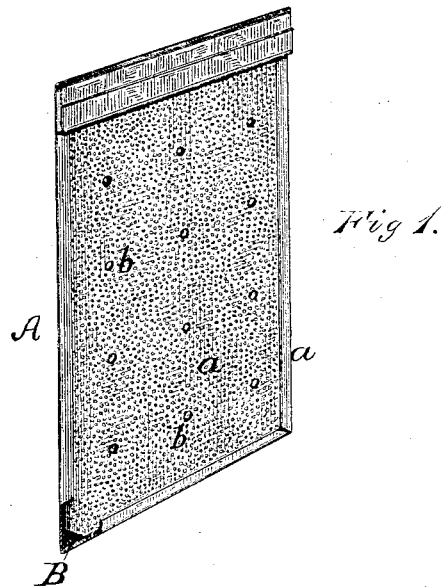
Figure 2:
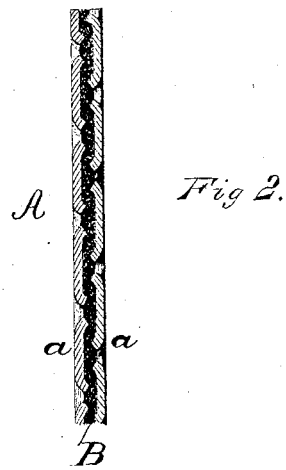

In the accompanying drawings, Figure 1 is a perspective view of the electrode embodying my present improvements, and Fig. 2 is an enlarged transverse section through a portion thereof.

The electrode A is made up of two perforated plates, *a a*, between which the finely-divided active material, or material to be made active, B, is held and secured. The plates *a a* are perforated with numerous small holes, and these are preferably made by punching the holes in the plates all from one side, whereby not only are the holes formed therein, but projections or points are formed on one side of the plate. The two plates *a a* are placed with their projections or points facing and opposed to each other, and preferably so that the projections of one plate pass or overlap those of the opposing plate, as shown in Fig. 2, and between the two is packed or otherwise placed the finely-divided active material, or material to be made active, whereby ready access of the fluid of the battery to said material is permitted, while said material is retained and held in its proper place against and between the inner sides of the plates as a layer or wadding, and is prevented from becoming detached or from falling down or becoming loose by the shaking or movement of the battery in use or while being handled or transported. The plates are secured together, and preferably at their edges, so as to prevent the escape of any active material at those points. I prefer said plates *a a* to be of lead and the finely-divided material to be of metallic lead, in the form of what I call "felt-foil"—that is, lead cut into thin flakes or fiber or hair like threads and packed together so as to resemble felt in its texture. Lead so made is very porous, and presents large surface for the chemical action to take place.

I have demonstrated an electrode constructed according to my present invention to be remarkably efficient. A battery provided with my improved electrodes is capable of receiving a high charge almost at the first charging operation, and consequently "formation" of the battery is rapid and complete. The felt-foil is entirely converted at one pole of the battery into peroxide of lead, and this is highly electro-negative to the metallic or reduced lead of the opposite pole.

I prefer that the lead plates *a a* be made one a little larger than the other, so that when the finely-divided material or felt-foil is placed between the plates the edges of the larger plate can be bent or lapped over the edges of the other, and the two be thus secured together with the active material, or material to be made active, between them, aided or not by other fastenings. In some instances, in addition to securing the plates *a a* at their edges, with the finely-divided material between them, I prefer to secure the plates together by metallic rivets *b*, distributed over the surface of the plates. (See Fig. 1.) This construction is advantageous, in that the plates are kept from expanding and contracting during the charging and discharging operations, which might destroy, to some extent, the conductivity of the element, and said rivets also aid in retaining the finely-divided material in place against the inner sides of said plates.

My improved electrodes can be prepared at the factory and transported or shipped without the escape of the active material, as will be obvious.

I of course do not limit myself to lead plates, nor to finely-divided lead as the active material or material to be made active. Other materials may be used.

I do not claim herein anything shown or described in Sellon's patent of June 13, 1882, which shows perforated plates having a mass of active material between them, but no interlocking projections and closed joints at the edges of the plates.

I claim herein as my invention—

An electrode for electric batteries, consisting of perforated plates connected together by a close joint at their edges, and having projections upon their opposing faces, with a continuous mass or wad of finely-divided material between said plates, into which said projections project to interlock with and retain said finely-divided mass in place between and upon said plates, substantially as described.

In testimony whereof I have hereunto subscribed my name this 10th day of May, A. D. 1883.

ELI T. STARR.

Witnesses:
WM. J. PEYTON,
EUGENE V. BROWN.